(12) United States Patent
Lovie et al.

(10) Patent No.: US 8,693,830 B2
(45) Date of Patent: Apr. 8, 2014

(54) DATA-CENTER CABLE

(75) Inventors: Raymond G. Lovie, Hickory, NC (US); Justin Elisha Quinn, Newton, NC (US)

(73) Assignee: Draka Comteq, B.V., Amsterdam (NL)

( * ) Notice: Subject to any disclaimer, the term of this patent is extended or adjusted under 35 U.S.C. 154(b) by 364 days.

(21) Appl. No.: 13/096,178

(22) Filed: Apr. 28, 2011

(65) Prior Publication Data

US 2011/0268400 A1 Nov. 3, 2011

Related U.S. Application Data

(60) Provisional application No. 61/328,837, filed on Apr. 28, 2010.

(51) Int. Cl.
*G02B 6/44* (2006.01)
*G02B 7/00* (2006.01)

(52) U.S. Cl.
CPC .................................... *G02B 7/005* (2013.01)
USPC ........................................................ 385/113

(58) Field of Classification Search
None
See application file for complete search history.

(56) References Cited

U.S. PATENT DOCUMENTS

| | | | |
|---|---|---|---|
| 4,838,643 A | 6/1989 | Hodges et al. |
| 5,574,816 A | 11/1996 | Yang et al. |
| 5,717,805 A | 2/1998 | Stulpin |
| 5,761,362 A | 6/1998 | Yang et al. |
| 5,911,023 A | 6/1999 | Risch et al. |
| 5,982,968 A | 11/1999 | Stulpin |
| 6,035,087 A | 3/2000 | Bonicel et al. |
| 6,066,397 A | 5/2000 | Risch et al. |
| 6,085,009 A | 7/2000 | Risch et al. |
| 6,134,363 A | 10/2000 | Hinson et al. |
| 6,175,677 B1 | 1/2001 | Yang et al. |
| 6,181,857 B1 | 1/2001 | Emeterio et al. |
| 6,210,802 B1 | 4/2001 | Risch et al. |
| 6,215,931 B1 | 4/2001 | Risch et al. |
| 6,314,224 B1 | 11/2001 | Stevens et al. |
| 6,321,012 B1 | 11/2001 | Shen |
| 6,321,014 B1 | 11/2001 | Overton et al. |
| 6,334,016 B1 | 12/2001 | Greer, IV |
| 6,381,390 B1 | 4/2002 | Hutton et al. |
| 6,493,491 B1 | 12/2002 | Shen et al. |
| 6,603,908 B2 | 8/2003 | Dallas et al. |
| 6,618,538 B2 | 9/2003 | Nechitailo et al. |
| 6,658,184 B2 | 12/2003 | Bourget et al. |
| 6,749,446 B2 | 6/2004 | Nechitailo |
| 6,912,347 B2 | 6/2005 | Rossi et al. |

(Continued)

FOREIGN PATENT DOCUMENTS

EP 1921478 A1 5/2008
WO 2009/062131 A1 5/2009

OTHER PUBLICATIONS

AFL Telecommunications, product specification sheet for "Interconnect Premise MicroCore Cable", Feb. 10, 2009, pp. 16-17.

(Continued)

*Primary Examiner* — Jennifer Doan
*Assistant Examiner* — Andrew Jordan
(74) *Attorney, Agent, or Firm* — Additon, Higgins, Pendleton & Ashe, P.A.

(57) ABSTRACT

The present invention relates to a data-center cable having good attenuation performance both at room temperature and during temperature cycling, as well as good resistance to compression.

20 Claims, 4 Drawing Sheets

(56) References Cited

U.S. PATENT DOCUMENTS

| | | | |
|---|---|---|---|
| 6,922,515 B2 | 7/2005 | Nechitailo et al. | |
| 6,941,049 B2 | 9/2005 | Risch et al. | |
| 7,045,010 B2 | 5/2006 | Sturman, Jr. | |
| 7,162,128 B2 | 1/2007 | Lovie et al. | |
| 7,322,122 B2 | 1/2008 | Overton et al. | |
| 7,346,244 B2 | 3/2008 | Gowan et al. | |
| 7,356,234 B2 | 4/2008 | de Montmorillon et al. | |
| 7,483,613 B2 | 1/2009 | Bigot-Astruc et al. | |
| 7,515,795 B2 | 4/2009 | Overton et al. | |
| 7,526,177 B2 | 4/2009 | Matthijsse et al. | |
| 7,555,186 B2 | 6/2009 | Flammer et al. | |
| 7,567,739 B2 | 7/2009 | Overton et al. | |
| 7,570,852 B2 | 8/2009 | Nothofer et al. | |
| 7,587,111 B2 | 9/2009 | de Montmorillon et al. | |
| 7,599,589 B2 | 10/2009 | Overton et al. | |
| 7,623,747 B2 | 11/2009 | de Montmorillon et al. | |
| 7,639,915 B2 | 12/2009 | Parris et al. | |
| 7,646,952 B2 | 1/2010 | Parris | |
| 7,646,954 B2 | 1/2010 | Tatat | |
| 7,702,204 B2 | 4/2010 | Gonnet et al. | |
| 7,724,998 B2 | 5/2010 | Parris et al. | |
| 7,817,891 B2 | 10/2010 | Lavenne et al. | |
| 7,889,960 B2 | 2/2011 | de Montmorillon et al. | |
| 8,041,167 B2* | 10/2011 | Overton | 385/109 |
| 2004/0151448 A1* | 8/2004 | Adams et al. | 385/113 |
| 2008/0292262 A1 | 11/2008 | Overton et al. | |
| 2009/0175583 A1 | 7/2009 | Overton | |
| 2009/0214167 A1 | 8/2009 | Lookadoo et al. | |
| 2009/0252469 A1 | 10/2009 | Sillard et al. | |
| 2009/0279833 A1 | 11/2009 | Overton et al. | |
| 2009/0279835 A1 | 11/2009 | de Montmorillon et al. | |
| 2009/0297107 A1 | 12/2009 | Tatat | |
| 2010/0021170 A1 | 1/2010 | Lumineau et al. | |
| 2010/0028020 A1 | 2/2010 | Gholami et al. | |
| 2010/0067855 A1 | 3/2010 | Barker | |
| 2010/0067857 A1 | 3/2010 | Lovie et al. | |
| 2010/0092135 A1 | 4/2010 | Barker et al. | |
| 2010/0092138 A1 | 4/2010 | Overton | |
| 2010/0092139 A1 | 4/2010 | Overton | |
| 2010/0092140 A1 | 4/2010 | Overton | |
| 2010/0118388 A1 | 5/2010 | Pastouret et al. | |
| 2010/0119202 A1 | 5/2010 | Overton | |
| 2010/0135623 A1 | 6/2010 | Overton | |
| 2010/0135624 A1 | 6/2010 | Overton et al. | |
| 2010/0135625 A1 | 6/2010 | Overton | |
| 2010/0135627 A1 | 6/2010 | Pastouret et al. | |
| 2010/0142033 A1 | 6/2010 | Regnier et al. | |
| 2010/0142969 A1 | 6/2010 | Gholami et al. | |
| 2010/0150505 A1 | 6/2010 | Testu et al. | |
| 2010/0154479 A1 | 6/2010 | Milicevic et al. | |
| 2010/0166375 A1 | 7/2010 | Parris | |
| 2010/0171945 A1 | 7/2010 | Gholami et al. | |
| 2010/0183821 A1 | 7/2010 | Hartsuiker et al. | |
| 2010/0189397 A1 | 7/2010 | Richard et al. | |
| 2010/0189399 A1 | 7/2010 | Sillard et al. | |
| 2010/0189400 A1 | 7/2010 | Sillard et al. | |
| 2010/0202741 A1 | 8/2010 | Ryan et al. | |
| 2010/0214649 A1 | 8/2010 | Burov et al. | |
| 2010/0215328 A1 | 8/2010 | Tatat et al. | |
| 2010/0254653 A1 | 10/2010 | Molin et al. | |
| 2010/0310218 A1 | 12/2010 | Molin et al. | |
| 2011/0026889 A1 | 2/2011 | Risch et al. | |
| 2011/0044595 A1 | 2/2011 | Sillard et al. | |
| 2011/0058781 A1 | 3/2011 | Molin et al. | |
| 2011/0064367 A1 | 3/2011 | Molin et al. | |
| 2011/0064371 A1 | 3/2011 | Leatherman et al. | |
| 2011/0069724 A1 | 3/2011 | Richard et al. | |
| 2011/0069932 A1 | 3/2011 | Overton et al. | |
| 2011/0091171 A1 | 4/2011 | Tatat et al. | |
| 2011/0116160 A1 | 5/2011 | Boivin et al. | |
| 2011/0123161 A1 | 5/2011 | Molin et al. | |
| 2011/0123162 A1 | 5/2011 | Molin et al. | |
| 2011/0135262 A1 | 6/2011 | Molin et al. | |
| 2011/0135263 A1 | 6/2011 | Molin et al. | |
| 2011/0176782 A1 | 7/2011 | Parris | |
| 2011/0188823 A1 | 8/2011 | Sillard et al. | |
| 2011/0188826 A1 | 8/2011 | Sillard et al. | |
| 2011/0217012 A1 | 9/2011 | Bigot-Astruc et al. | |
| 2011/0229101 A1 | 9/2011 | de Montmorillon et al. | |
| 2011/0268400 A1 | 11/2011 | Lovie et al. | |
| 2012/0093468 A1* | 4/2012 | Keller et al. | 385/106 |
| 2012/0183267 A1* | 7/2012 | Jiang et al. | 385/124 |

OTHER PUBLICATIONS

Draka, product specification sheet for "Graded-Index Multimode Optical Fiber" (50/125 um), (2009) pp. 1-2.
Draka, product specification sheet for "MaxCap-OM2+—10 Gb/s CIMM Optical Fiber", (2009) pp. 1-2.
Draka, product specification sheet for "MaxCap-OM3—10 Gb/s Multimode Optical Fiber", (2009) pp. 1-2.
Draka, product specification sheet for "MaxCap-OM4—10 Gb/s Multimode Optical Fiber", (2009) pp. 1-2.
Draka, product specification sheet for "MaxCap-BB-OMx-Bend-Insensitive Multimode Optical Fiber", (2010) pp. 1-2.

* cited by examiner

DATA-CENTER CABLE

CROSS-REFERENCE TO PRIORITY APPLICATION

This application claims the benefit of U.S. Patent Application No. 61/328,837 for a "Data-Center Cable" (filed Apr. 28, 2010), which is hereby incorporated by reference in its entirety.

FIELD OF THE INVENTION

The present invention relates to an optical-fiber cable that is particularly suitable for use as a data-center cable.

BACKGROUND

As compared with traditional wire-based networks, optical-fiber communication networks are capable of transmitting significantly more information at significantly higher speeds. Optical fibers, therefore, are being increasingly employed in communication networks.

To expand total transmission throughput, optical-fiber network providers are attempting to place ever more optical fibers in ever smaller spaces. Packing fibers into tight spaces can cause undesirable attenuation. Indeed, there is an inherent trade-off between increased fiber density and signal attenuation.

In FTTx installations (e.g., fiber to the premises/business/home), interconnect cables are often deployed indoors for applications involving tight bends and space-constrained routing (e.g., in data centers and multi-dwelling units). In such installations, MTP/MPO connectors are often used to provide high-density interconnections.

Accordingly, a need exists for optical-fiber cables that are compatible with MTP/MPO connectors, that have good attenuation performance, and that have sufficient resistance to compression.

SUMMARY

Accordingly, in one aspect, the present invention embraces an optical-fiber cable. In an exemplary embodiment, the optical-fiber cable includes a plurality of multimode optical fibers that comply with the ITU-T G.651.1 recommendations. The optical-fiber cable also includes a plurality of strength yarns, which may be lubricated (e.g., coated with a lubricant such as TEFLON®). A jacket having an outer diameter of 3.2 millimeters or less surrounds the optical fibers and the strength yarns. Typically, the optical-fiber cable has an inner cable filling coefficient of at least about 0.15.

The optical-fiber cable has a maximum attenuation of less than about 3.5 dB/km at a wavelength of 850 nanometers and less than about 1.5 dB/km at a wavelength of 1300 nanometers, measured on a drum having a diameter of about 250 millimeters (i.e., about 9.85 inches). Moreover, as measured using the FOTP-3 procedure, the optical-fiber cable has a maximum increase in attenuation (i.e., added loss) of less than about 0.60 dB/km at a wavelength of 1300 nanometers using a minimum temperature of about 0° C. and a maximum temperature of about 70° C. In addition, as measured using the FOTP-41 procedure, the optical-fiber cable has a maximum increase in attenuation of less than about 0.60 dB at a wavelength of 1300 nanometers using a compressive load of about 20 lb/in.

The foregoing illustrative summary, as well as other exemplary objectives and/or advantages of the invention, and the manner in which the same are accomplished, are further explained within the following detailed description and its accompanying drawings.

DETAILED DESCRIPTION

In one aspect, the present invention embraces an optical-fiber cable suitable for use as a data-center cable. In this regard, the present data-center cables typically meet or exceed the requirements for plenum interconnect cables defined by the GR-409 and ICEA 596 standards. The GR-409 and ICEA 596 standards are hereby incorporated by reference in their entirety. Data-center cables in accordance with the present invention also typically have good attenuation performance at room temperature and during temperature cycling. Moreover, the present data-center cables typically have good resistance to compression.

Figure 1:
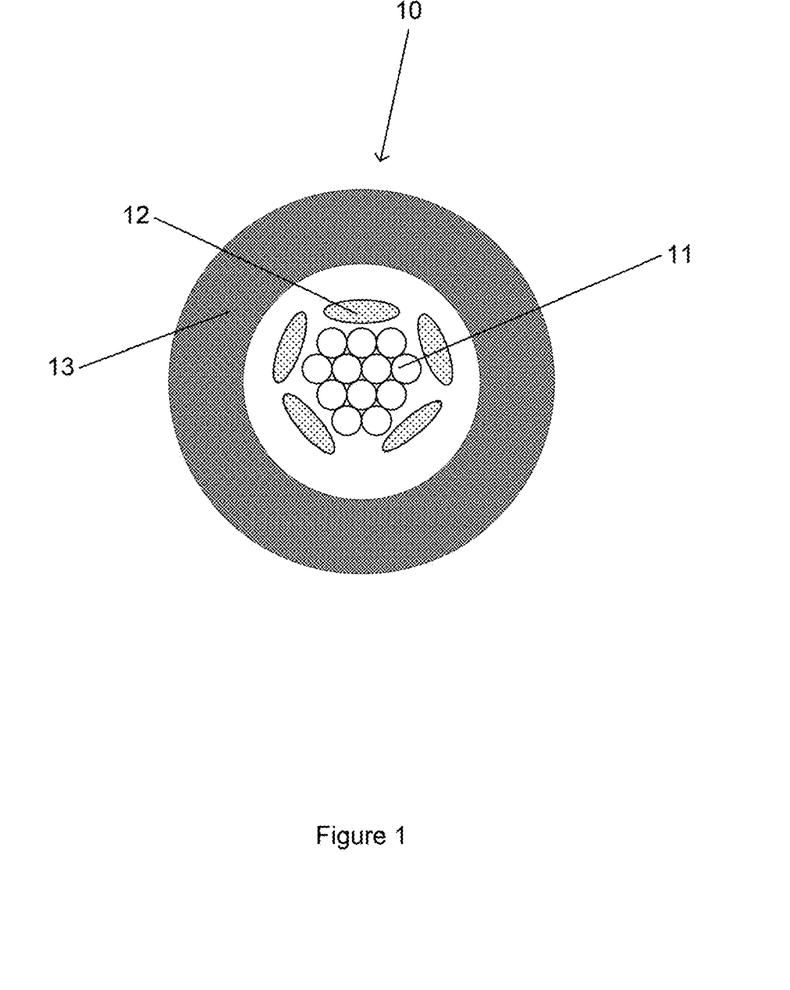
FIG. 1 schematically depicts a cross-sectional view of a data-center cable in accordance with the present invention.

An exemplary data-center cable 10 is depicted in FIG. 1. The data-center cable 10 includes a plurality of optical fibers 11 (e.g., 12 optical fibers) positioned within a cable jacket 13. The data-center cable 10 also typically includes one or more strength yarns 12 (e.g., five strength yarns) positioned between the cable jacket 13 and the optical fibers 11. The strength yarns 12, which provide tensile strength, are typically made of aramid fibers.

In a particular embodiment, the strength yarns 12 are coated with a lubricant (e.g., TEFLON® fluoropolymers), which has been observed to reduce unwanted attenuation, such as when the data-center cable 10 is subjected to relatively tight bends (i.e., bends having a small bend radius). In addition, the presence of a lubricant on the strength yarns 12 seems to facilitate removal of the cable jacket 13 by reducing unwanted bonding between the strength yarns 12 and the surrounding cable jacket 13. This seems to enhance the handling of the data-center cable 10, such as during connectorization operations. The lubricant present on the strength yarns 12, however, should not impair desired flame-resistance requirements (e.g., flame spread, peak smoke, or average smoke). By way of example, the lubricant present on the strength yarns 12 may include approximately 50 weight percent or more of fluoropolymers.

Typically, the strength yarns 12 are coated with lubricant such that the lubricant constitutes between about one and 95 weight percent of the lubricant-coated strength yarns 12 (e.g., 50 percent by weight). In some embodiments, the lubricant may constitute between about five and 75 weight percent of the lubricant-coated strength yarns 12. In a particular embodiment, the lubricant may constitute approximately 5-15 weight percent (e.g., about eight percent) of the lubricant-coated strength yarns 12.

The cable jacket 13 may be a single-layer jacket formed from a dielectric material (e.g., non-conducting polymers), with or without supplemental structural components that may be used to improve protection and strength. By way of example, the cable jacket 13 may be formed from flexible, plenum-grade polymeric materials, such as polyvinyl chloride (PVC), polyethylene, polypropylene, polyamides (e.g., nylon), or polyester (e.g., PBT). In an exemplary embodiment, the cable jacket 13 is formed from a halogen-free flame retardant (HFFR) material. The cable jacket 13 may also contain other additives, such as nucleating agents, flame retardants, smoke retardants, antioxidants, UV absorbers, and/or plasticizers. In particular, the cable jacket 13 enables the present data-center cable 10 to achieve a plenum flame rating (e.g., NFPA 262, OFNP, and/or CSA FT 6). Accordingly, the present data-center cables are typically suitable for installation in a plenum.

Typically, the cable jacket 13 has an outer diameter of no more than about 3.2 millimeters so that the data-center cable 10 can be connected to a MTP/MPO connector. Moreover, the cable jacket 13 typically has a thickness of more than about 0.5 millimeter, such as between about 0.55 millimeter and 0.65 millimeter to ensure that the cable jacket 13 provides sufficient crush resistance.

As noted, the data-center cable 10 includes a plurality of optical fibers 11. In a typical embodiment, the optical fibers 11 have an excess fiber length (EFL) of about 0.04 percent. The optical fibers are typically stranded around themselves using reverse oscillated lay stranding, known as "S-Z" stranding. That said, the optical fibers 11 may be helically stranded (e.g., using "S" or "Z" stranding). Moreover, the strength yarns 12 are typically stranded (e.g., using helical "S" or "Z" stranding) around the optical fibers 11.

The present data-center cables typically have a relatively high inner cable filling coefficient. As used herein, the term "inner cable filling coefficient" of an optical-fiber cable refers to the ratio of the sum of the cross-sectional areas of all of the optical fibers within the optical-fiber cable versus the inner cross-sectional area of the optical-fiber cable (i.e., defined by the inner boundary of the cable's outer jacket). As used herein and unless otherwise noted, the term "inner cable filling coefficient" employs the inner cross-sectional area of the optical-fiber cable. In this regard, the present data-center cables typically have an inner cable filling coefficient of at least about 0.15, more typically between about 0.18 and 0.22 (e.g., about 0.21). By way of example, a data-center cable (i) with a jacket having an inner diameter of about 0.19 and (ii) including 12 optical fibers with an outer diameter of 242 microns, would have an inner cable filling coefficient of about 0.195.

In a typical embodiment, the data-center cable 10 includes a plurality of multimode optical fibers (e.g., multimode fibers with a 50-micron core, such as OM2 multimode fibers, that comply with the ITU-T G.651.1 recommendations). The ITU-T G.651.1 standard (July 2007) is hereby incorporated by reference in its entirety. Exemplary multimode optical fibers that may be employed include MaxCap™ multimode optical fibers (OM2+, OM3, or OM4) commercially available from Draka (Claremont, N.C.). Table 1 (below) depicts the multimode-fiber attributes specified by the ITU-T G.651.1 recommendations.

TABLE 1

(ITU-T G.651.1 Fiber Attributes)

| Attribute | Detail | Value |
| --- | --- | --- |
| Cladding Diameter | Nominal (μm) | 125 |
| | Tolerance (μm) | ±2 |
| Core Diameter | Nominal (μm) | 50 |

TABLE 1-continued (ITU-T G.651.1 Fiber Attributes)

| Attribute | Detail | Value |
| --- | --- | --- |
| | Tolerance (μm) | ±3 |
| Core-Cladding Concentricity Error | Maximum (μm) | 3 |
| Core Non-Circularity | Maximum | 6% |
| Cladding Non-Circularity | Maximum | 2% |
| Numerical Aperture | Nominal | 0.20 |
| | Tolerance | ±0.015 |
| Macrobend Loss | Radius (mm) | 15 |
| | Number of Turns | 2 |
| | Maximum @850 nm (dB) | 1 |
| | Maximum @1300 nm (dB) | 1 |
| Proof Stress | Minimum (GPa) | 0.69 |
| Modal Bandwidth-Length Product for Overfilled Launch | Minimum @850 nm (MHz · km) | 500 |
| | Minimum @1300 nm (MHz · km) | 500 |
| Chromatic Dispersion Coefficient | $\lambda_{0min}$ (nm) | 1295 |
| | $\lambda_{0max}$ (nm) | 1340 |
| | $S_{0max}$ (1295 nm ≤ $\lambda_0$ ≤ 1310 nm) (ps/(nm² · km)) | ≤0.105 |
| | $S_{0max}$ (1310 nm ≤ $\lambda_0$ ≤ 1340 nm) (ps/(nm² · km)) | ≤375 · (1590 − $\lambda_0$) · $10^{-6}$ |

Alternatively, the present data-center cable 10 may include bend-insensitive multimode fibers, such as MaxCap™-BB-OMx multimode fibers commercially available from Draka (Claremont, N.C.). In this regard, bend-insensitive multimode fibers typically have macrobending losses of (i) no more than 0.1 dB at a wavelength of 850 nanometers for a winding of two turns around a bending radius of 15 millimeters and (ii) no more than 0.3 dB at a wavelength of 1300 nanometers for a winding of two turns around a bending radius of 15 millimeters.

In contrast, standard multimode fibers, in accordance with the ITU-T G.651.1 standard, have macrobending losses of (i) no more than 1 dB at a wavelength of 850 nanometers for a winding of two turns around a bending radius of 15 millimeters and (ii) no more than 1 dB at a wavelength of 1300 nanometers for a winding of two turns around a bending radius of 15 millimeters. Moreover, as measured using a winding of two turns around a bending radius of 15 millimeters, such multimode fibers typically have macrobending losses of (i) greater than 0.1 dB, more typically greater than 0.2 dB (e.g., 0.3 dB or more), at a wavelength of 850 nanometers and (ii) greater than 0.3 dB, more typically greater than 0.4 dB (e.g., 0.5 dB or more), at a wavelength of 1300 nanometers.

In another embodiment, the data-center cable 10 includes a plurality of standard single-mode fibers (SSMF). Suitable single-mode optical fibers that are compliant with the ITU-T G.652.D standard (November 2009) are commercially available, for instance, from Draka (Claremont, N.C.). The ITU-T G.652 recommendations (November 2009) and each of its attributes (i.e., A, B, C, and D) are hereby incorporated by reference.

In yet another embodiment, the data-center cable 10 includes a plurality of bend-insensitive single-mode optical fibers. Bend-insensitive single-mode optical fibers, which are less susceptible to attenuation (e.g., caused by microbending or macrobending), are commercially available from Draka (Claremont, N.C.) under the trade name BendBright®. BendBright® optical fibers are compliant with the ITU-T G.652.D standard. That said, it is within the scope of the present invention to employ a bend-insensitive glass fiber that meets the ITU-T G.657.A recommendations (e.g., the ITU-T G.657.A1 (November 2009) and the ITU-T G.657.A2 (November 2009) subcategories) and/or the ITU-T G.657.B recommendations (e.g., the ITU-T G.657.B2 (November 2009) and the ITU-T G.657.B3 (November 2009) subcategories). The ITU-T G.657.A/B standards are hereby incorporated by reference in their entirety.

In this regard, particularly outstanding bend-insensitive single-mode glass fibers for use in the present invention are commercially available from Draka (Claremont, N.C.) under the trade name BendBright$^{XS}$®. BendBright$^{XS}$® optical fibers are not only compliant with both the ITU-T G.652.D and ITU-T G.657.A/B recommendations but also demonstrate significant improvement with respect to both macrobending and microbending.

As set forth in commonly assigned International Patent Application Publication No. WO 2009/062131 A1 for a Microbend-Resistant Optical Fiber and U.S. Patent Application Publication No. US 2009/0175583 for a Microbend-Resistant Optical Fiber, pairing a bend-insensitive glass fiber (e.g., Draka's single-mode glass fibers available under the trade name BendBright$^{XS}$®) and a primary coating having very low modulus achieves optical fibers having exceptionally low losses (e.g., reductions in microbend sensitivity of at least 10× as compared with a single-mode fiber employing a conventional coating system). Each of these patent application publications is hereby incorporated by reference in its entirety.

The optical fibers deployed in the present data-center cable may employ the coatings disclosed in International Patent Application Publication No. WO 2009/062131 A1 and U.S. Patent Application Publication No. US 2009/0175583 with either single-mode optical fibers or multimode optical fibers.

Optical fibers typically have an outer diameter of between about 235 microns and 265 microns, although optical fibers having a smaller diameter are within the scope of the present invention.

By way of example, the component glass fiber may have an outer diameter of about 125 microns. With respect to the optical fiber's surrounding coating layers, the primary coating may have an outer diameter of between about 175 microns and 195 microns (i.e., a primary coating thickness of between about 25 microns and 35 microns) and the secondary coating may have an outer diameter of between about 235 microns and 265 microns (i.e., a secondary coating thickness of between about 20 microns and 45 microns). At least one of the coating layers—typically the secondary coating—may be colored and/or possess other markings to help identify individual fibers. Optionally, the optical fiber may include an outermost ink layer, which is typically between two and ten microns.

In one alternative embodiment, an optical fiber may possess a reduced diameter (e.g., an outermost diameter between about 150 microns and 230 microns). In this alternative optical fiber configuration, the thickness of the primary coating and/or secondary coating is reduced, while the diameter of the component glass fiber is maintained at about 125 microns.

By way of example, in such exemplary embodiments the primary coating layer may have an outer diameter of between about 135 microns and about 175 microns (e.g., about 160 microns), typically less than 165 microns (e.g., between about 135 microns and 150 microns) and usually more than 140 microns (e.g., between about 145 microns and 155 microns, such as about 150 microns). Moreover, in such exemplary embodiments the secondary coating layer may have an outer diameter of between about 150 microns and about 230 microns (e.g., more than about 165 microns, such as 190-210 microns or so), typically between about 180 microns and 200 microns. In other words, the total diameter of the optical fiber is reduced to less than about 230 microns (e.g., between about 195 microns and 205 microns, and especially about 200 microns).

In another alternative embodiment, the diameter of the component glass fiber may be reduced to less than 125 microns (e.g., between about 60 microns and 120 microns), perhaps between about 70 microns and 115 microns (e.g., about 80-110 microns). This may be achieved, for instance, by reducing the thickness of one or more cladding layers. As compared with the prior alternative embodiment, (i) the total diameter of the optical fiber may be reduced (i.e., the thickness of the primary and secondary coatings are maintained in accordance with the prior alternative embodiment) or (ii) the respective thicknesses of the primary and/or secondary coatings may be increased relative to the prior alternative embodiment (e.g., such that the total diameter of the optical fiber might be maintained).

By way of illustration, with respect to the former, a component glass fiber having a diameter of between about 90 and 100 microns might be combined with a primary coating layer having an outer diameter of between about 110 microns and 150 microns (e.g., about 125 microns) and a secondary coating layer having an outer diameter of between about 130 microns and 190 microns (e.g., about 155 microns). With respect to the latter, a component glass fiber having a diameter of between about 90 and 100 microns might be combined with a primary coating layer having an outer diameter of between about 120 microns and 140 microns (e.g., about 130 microns) and a secondary coating layer having an outer diameter of between about 160 microns and 230 microns (e.g., about 195-200 microns).

As noted, the present data-center cables have good attenuation performance at room temperature (e.g., at about 22° C.). Accordingly, the present data-center cables typically have a maximum attenuation of less than about 3.5 dB/km at a wavelength of 850 nanometers (nm) and less than about 1.5 dB/km at a wavelength of 1300 nanometers. More typically, data-center cables in accordance with the present invention have a maximum attenuation of less than about 3.0 dB/km (e.g., less than about 2.8 dB/km) at 850 nanometers and less than about 1.0 dB/km at 1300 nanometers.

In measuring attenuation at room temperature (e.g., about 22° C.), a data-center cable having a plurality of standard multimode fibers is wrapped around a drum having a diameter of about 250 millimeters. Afterward, the maximum attenuation is measured.

The attenuation of the present data-center cables has also been measured on a drum having a diameter of about 660 millimeters (i.e., about 26 inches). When on a 660-millimeter drum, the present data-center cables typically have a maximum attenuation of less than about 1.0 dB/km at a wavelength of 1300 nanometers, more typically less than about 0.8 dB/km (e.g., about 0.6 dB/km or less).

The present data-center cables have good attenuation performance during and after temperature cycling. In this regard, the present data-center cables have been tested per the FOTP-3 "Procedure to Measure Temperature Cycling Effects on Optical Fiber Units, Optical Cable, and Other Passive Fiber Optic Components." The FOTP-3 procedure is hereby incorporated by reference in its entirety.

In performing temperature-cycling testing, a 600-meter cable sample was wrapped around a drum lined with foam and having a diameter of about 660 millimeters. The cable sample contained a plurality of standard multimode fibers (e.g., 12 optical fibers). At least two complete temperature cycles were completed, in particular using a minimum temperature of about 0° C. and a maximum temperature of about 70° C. A soak time (i.e., exposure time) of about 12 hours was employed. Cable attenuation was measured during the last cycle at 0° C. and at 70° C.

The present data-center cables typically have a maximum attenuation increase (i.e., added loss) during the last cycle (e.g., measured at a minimum temperature of about 0° C. and a maximum temperature of about 70° C.) of no more than about 0.60 dB/km at 1300 nanometers, more typically less than about 0.40 dB/km at 1300 nanometers (e.g., 0.30 dB/km or less).

Additionally, the present data-center cables have been tested under harsher conditions than described above. For example, temperature cycling has been performed using a minimum temperature of about −20° C. Using a minimum temperature of about −20° C. and a maximum temperature of about 70° C., the present data-center cables typically have a maximum attenuation increase of no more than about 0.60 dB/km (e.g., less than about 0.40 dB/km) at 1300 nanometers, as measured during the last cycle.

In addition to good attenuation performance, the present data-center cables have good crush resistance.

Data-center cables having a plurality of standard multimode fibers have been tested for crush performance in accordance with the FOTP-41 "Compressive Loading Resistance of Fiber Optic Cables" procedure. The FOTP-41 procedure is hereby incorporated by reference in its entirety. In testing for crush resistance, a four-inch segment of a 175-meter sample of the present data-center cables was subjected to a compressive load of about 20 lb/in (i.e., about 3500 N/m) for ten minutes. In other words, the four-inch segment was subjected to an 80-lb load. In accordance with the GR-409 and ICEA 596 standards, the attenuation of the data-center cable is then measured under load.

After being subject to a 20 lb/in compressive load and in accordance with the GR-409 standard, the present data-center cables have a maximum increase in attenuation of no more than about 0.6 dB at 1300 nanometers. In accordance with the ICEA 596 standard, the present data-center cables typically have a maximum increase in attenuation of no more than about 0.4 dB at 1300 nanometers with 90 percent of the multimode optical fibers having an increase in attenuation of no more than about 0.3 dB at 1300 nanometers. More typically, the present data-center cables have a maximum increase in attenuation of less than about 0.2 dB at 1300 nanometers (e.g., less than about 0.15 dB).

Table 2 (below) displays testing results for an exemplary data-center cable in accordance with the present invention.

TABLE 2

(Testing Results for Exemplary Cable)

| | |
|---|---|
| Cable Jacket Outer Diameter (mm) | 3.2 |
| Cable Jacket Inner Diameter (mm) | 1.9 |
| Strength Yarns (TEFLON ® Coated) | 5 |
| Optical Fibers (Multimode) | 12 |

TABLE 2-continued (Testing Results for Exemplary Cable)

| | |
|---|---|
| Inner Cable Filling Coefficient | 0.195 |
| Maximum Attenuation (dB/km at 850 nm) 250-mm drum | 2.654 |
| Maximum Attenuation (dB/km at 1300 nm) 250-mm drum | 0.96 |
| Maximum Attenuation (dB/km at 1300 nm) 660-mm drum | 0.567 |
| Maximum Attenuation Increase (dB/km at 1300 nm) Two cycles 0° C. to 70° C. | 0.241 |
| Maximum Attenuation Increase (dB/km at 1300 nm) Two cycles −20° C. to 70° C. | 0.322 |
| Maximum Attenuation Increase (dB at 1300 nm) 20 lb/in compressive load | 0.114 |

Figure 2:
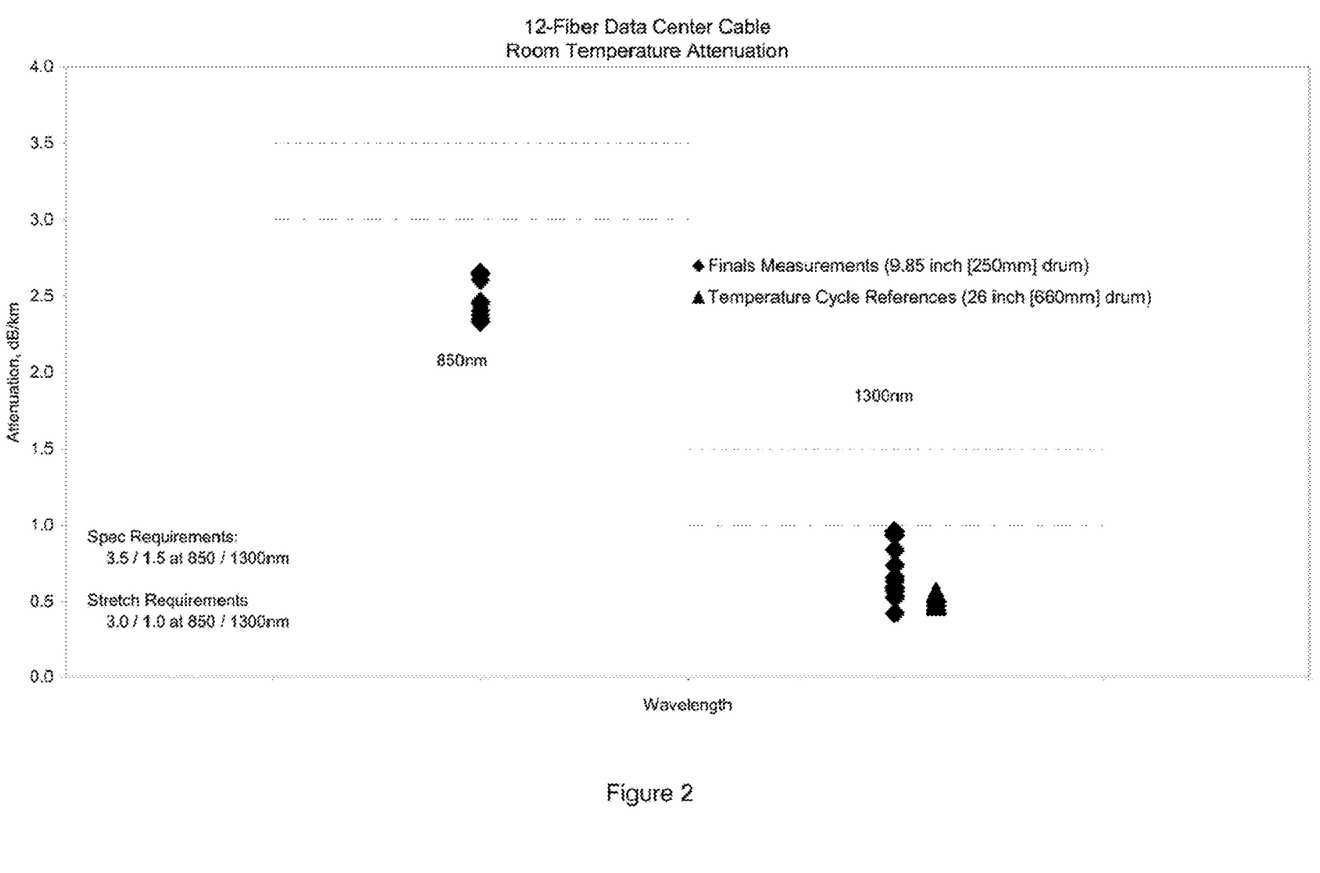
FIG. 2 depicts attenuation testing results taken at room temperature for an exemplary data-center cable in accordance with the present invention.
Figure 3:
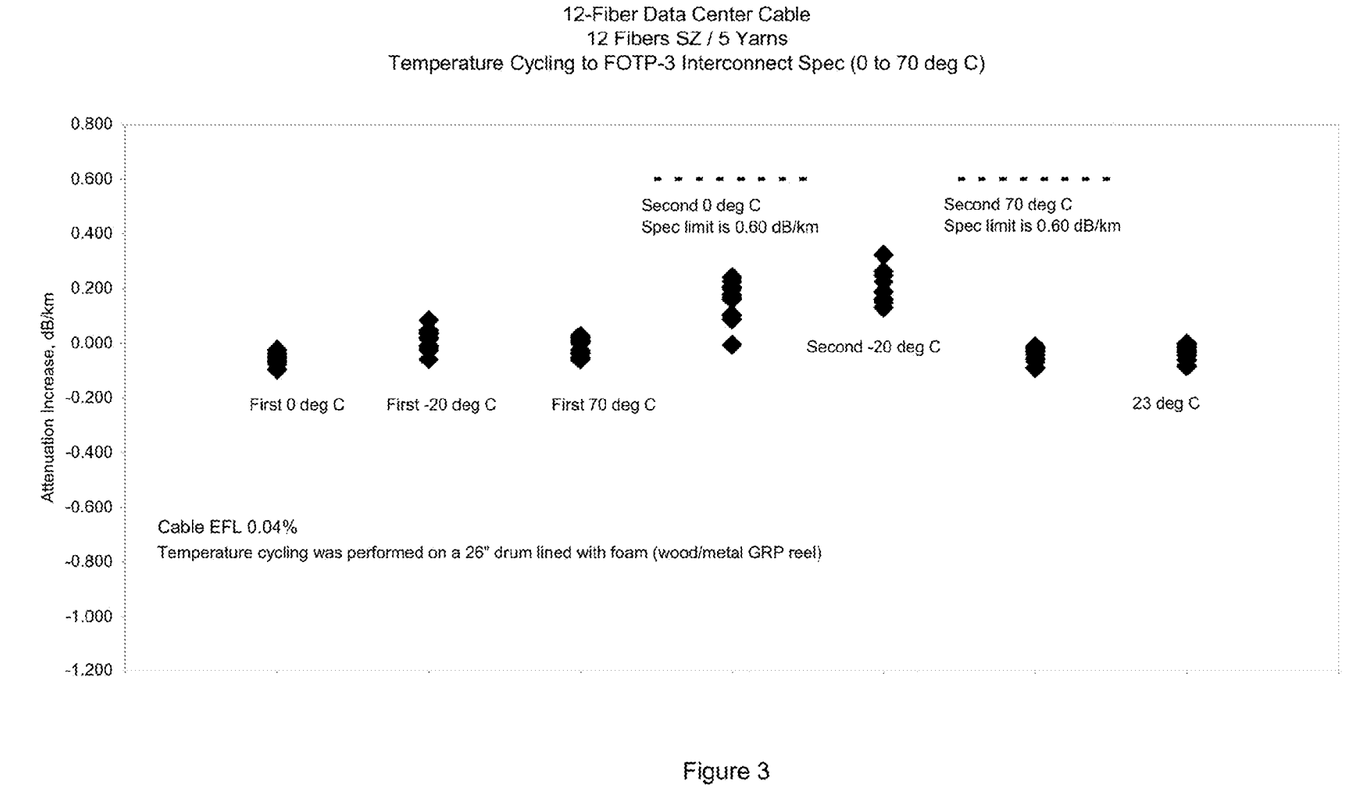
FIG. 3 depicts attenuation testing results taken during the FOTP-3 temperature cycling procedure for an exemplary data-center cable in accordance with the present invention.
Figure 4:
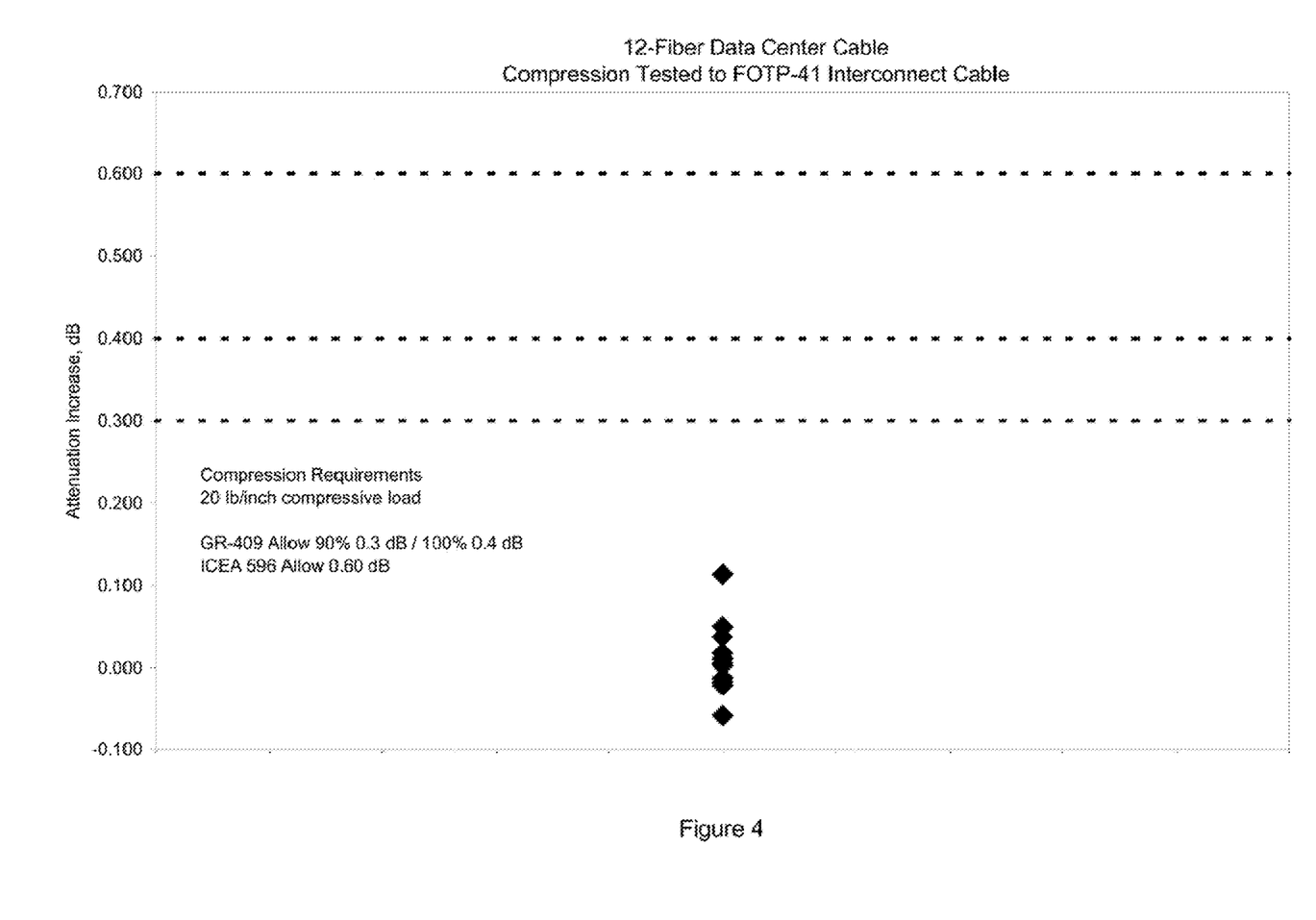
FIG. 4 depicts compression testing results taken during the FOTP-41 procedure for an exemplary data-center cable in accordance with the present invention.

Moreover, FIGS. 2-4 depict detailed testing results for an exemplary data-center cable. Tables 3-5 (below) provide testing results corresponding with FIGS. 2-4, respectively.

TABLE 3

(Room Temperature Attenuation)

| Fiber | Attenuation (dB/km at 850 nm) 250-mm drum | Attenuation (dB/km at 1300 nm) 250-mm drum | Attenuation (dB/km at 1300 nm) 660-mm drum |
|---|---|---|---|
| Blue | 2.451 | 0.594 | 0.484 |
| Orange | 2.334 | 0.530 | 0.493 |
| Green | 2.407 | 0.740 | 0.480 |
| Brown | 2.352 | 0.527 | 0.480 |
| Slate | 2.462 | 0.633 | 0.567 |
| White | 2.460 | 0.659 | 0.559 |
| Red | 2.376 | 0.570 | 0.501 |
| Black | 2.648 | 0.840 | 0.497 |
| Yellow | 2.644 | 0.935 | 0.530 |
| Violet | 2.642 | 0.592 | 0.472 |
| Rose | 2.608 | 0.424 | 0.551 |
| Aqua | 2.654 | 0.960 | 0.501 |

TABLE 4

(Temperature Cycling Results)

| Fiber | Attenuation (dB/km at 1300 nm) (660-mm drum) 23° C. Reference | Attenuation Increase (dB/km at 1300 nm) (660-mm drum) | | | | | | |
|---|---|---|---|---|---|---|---|---|
| | | 1st 0° C. | 1st −20° C. | 1st 70° C. | 2nd 0° C. | 2nd −20° C. | 2nd 70° C. | Final 23° C. |
| Blue | 0.484 | −0.025 | 0.034 | 0.009 | 0.202 | 0.185 | −0.023 | −0.014 |
| Orange | 0.493 | −0.049 | −0.011 | 0.020 | 0.167 | 0.161 | −0.011 | −0.004 |
| Green | 0.480 | −0.028 | 0.084 | 0.026 | 0.241 | 0.224 | −0.013 | −0.002 |
| Brown | 0.480 | −0.045 | 0.042 | 0.002 | 0.205 | 0.157 | −0.032 | −0.024 |
| Slate | 0.567 | −0.071 | 0.046 | −0.055 | 0.225 | 0.261 | −0.092 | −0.085 |
| White | 0.559 | −0.097 | −0.06 | −0.060 | −0.006 | 0.130 | −0.054 | −0.082 |
| Red | 0.501 | −0.062 | 0.013 | −0.026 | 0.104 | 0.150 | −0.028 | −0.036 |
| Black | 0.497 | −0.057 | 0.036 | 0.000 | 0.197 | 0.149 | −0.026 | −0.024 |
| Yellow | 0.530 | −0.048 | −0.017 | 0.008 | 0.087 | 0.248 | −0.041 | −0.036 |
| Violet | 0.472 | −0.038 | 0.02 | 0.010 | 0.177 | 0.188 | −0.020 | −0.008 |
| Rose | 0.551 | −0.078 | −0.028 | −0.027 | 0.160 | 0.225 | −0.059 | −0.062 |
| Aqua | 0.501 | −0.064 | 0.016 | −0.038 | 0.100 | 0.322 | −0.068 | −0.045 |
| Max | 0.567 | −0.025 | 0.084 | 0.026 | 0.241 | 0.322 | −0.011 | −0.002 |
| Avg | 0.510 | −0.055 | 0.015 | −0.011 | 0.155 | 0.200 | −0.039 | −0.035 |
| Min | 0.472 | −0.097 | −0.06 | −0.060 | −0.006 | 0.130 | −0.092 | −0.085 |

TABLE 5

(Compression Testing Results)

| Fiber | Attenuation Increase (dB at 1300 nm) compressive load - 20 lb/in (10 minutes) |
|---|---|
| Blue | −0.021 |
| Green | −0.012 |
| Brown | 0.012 |
| Slate | 0.003 |
| White | −0.017 |
| Red | 0.018 |
| Black | 0.050 |
| Yellow | 0.006 |
| Violet | −0.059 |
| Rose | 0.038 |
| Aqua | 0.114 |
| Maximum | 0.114 |
| Average | 0.012 |
| Minimum | −0.059 |

To supplement the present disclosure, this application incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Pat. No. 7,623,747 for a Single Mode Optical Fiber (de Montmorillon et al.); U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (Bigot-Astruc et al.); U.S. Pat. No. 7,526,177 for a Fluorine-Doped Optical Fiber (Matthijsse et al.); U.S. Pat. No. 7,555,186 for an Optical Fiber (Flammer et al.); U.S. Patent Application Publication No. US2009/0252469 A1 for a Dispersion-Shifted Optical Fiber (Sillard et al.); U.S. Patent Application Publication No. US2011/0044595 A1 for a Transmission Optical Fiber Having Large Effective Area (Sillard et al.); International Patent Application Publication No. WO 2009/062131 A1 for a Microbend-Resistant Optical Fiber, (Overton); U.S. Patent Application Publication No. US2009/0175583 A1 for a Microbend-Resistant Optical Fiber, (Overton); U.S. Patent Application Publication No. US2009/0279835 A1 for a Single-Mode Optical Fiber Having Reduced Bending Losses, filed May 6, 2009, (de Montmorillon et al.); U.S. Pat. No. 7,889,960 for a Bend-Insensitive Single-Mode Optical Fiber, (de Montmorillon et al.); U.S. Patent Application Publication No. US2010/0021170 A1 for a Wavelength Multiplexed Optical System with Multimode Optical Fibers, filed Jun. 23, 2009, (Lumineau et al.); U.S. Patent Application Publication No. US2010/0028020 A1 for a Multimode Optical Fibers, filed Jul. 7, 2009, (Gholami et al.); U.S. Patent Application Publication No. US2010/0119202 A1 for a Reduced-Diameter Optical Fiber, filed Nov. 6, 2009, (Overton); U.S. Patent Application Publication No. US2010/0142969 A1 for a Multimode Optical System, filed Nov. 6, 2009, (Gholami et al.); U.S. Patent Application Publication No. US2010/0118388 A1 for an Amplifying Optical Fiber and Method of Manufacturing, filed Nov. 12, 2009, (Pastouret et al.); U.S. Patent Application Publication No. US2010/0135627 A1 for an Amplifying Optical Fiber and Production Method, filed Dec. 2, 2009, (Pastouret et al.); U.S. Patent Application Publication No. US2010/0142033 for an Ionizing Radiation-Resistant Optical Fiber Amplifier, filed Dec. 8, 2009, (Regnier et al.); U.S. Patent Application Publication No. US2010/0150505 A1 for a Buffered Optical Fiber, filed Dec. 11, 2009, (Testu et al.); U.S. Patent Application Publication No. US2010/0171945 for a Method of Classifying a Graded-Index Multimode Optical Fiber, filed Jan. 7, 2010, (Gholami et al.); U.S. Patent Application Publication No. US2010/0189397 A1 for a Single-Mode Optical Fiber, filed Jan. 22, 2010, (Richard et al.); U.S. Patent Application Publication No. US2010/0189399 A1 for a Single-Mode Optical Fiber Having an Enlarged Effective Area, filed Jan. 27, 2010, (Sillard et al.); U.S. Patent Application Publication No. US2010/0189400 A1 for a Single-Mode Optical Fiber, filed Jan. 27, 2010, (Sillard et al.); U.S. Patent Application Publication No. US2010/0214649 A1 for an Optical Fiber Amplifier Having Nanostructures, filed Feb. 19, 2010, (Burow et al.); U.S. Patent Application Publication No. US2010/0254653 A1 for a Multimode Fiber, filed Apr. 22, 2010, (Molin et al.); U.S. Patent Application Publication No. US2010/0310218 A1 for a Large Bandwidth Multimode Optical Fiber Having a Reduced Cladding Effect, filed Jun. 4, 2010, (Molin et al.); U.S. Patent Application Publication No. US2011/0058781 A1 for a Multimode Optical Fiber Having Improved Bending Losses, filed Sep. 9, 2010, (Molin et al.); U.S. Patent Application Publication No. US2011/0064367 A1 for a Multimode Optical Fiber, filed Sep. 17, 2010, (Molin et al.); U.S. Patent Application Publication No. US2011/0069724 A1 for an Optical Fiber for Sum-Frequency Generation, filed Sep. 22, 2010, (Richard et al.); U.S. patent application Ser. No. 12/944,422 for a Rare-Earth-Doped Optical Fiber Having Small Numerical Aperture, filed Nov. 11, 2010, (Boivin et al.); U.S. patent application Ser. No. 12/953,948 for a High-Bandwidth, Multimode Optical Fiber with Reduced Cladding Effect, filed Nov. 24, 2010, (Molin et al.); U.S. patent application Ser. No. 12/954,036 for a High-Bandwidth, Dual-Trench-Assisted Multimode Optical Fiber, filed Nov. 24, 2010, (Molin et al.); U.S. patent application Ser. No. 12/959,688 for a Multimode Optical Fiber with Low Bending Losses and Reduced Cladding Effect, filed Dec. 3, 2010, (Molin et al.); U.S. patent application Ser. No. 12/959,866 for a High-Bandwidth Multimode Optical Fiber Having Reduced Bending Losses, filed Dec. 3, 2010, (Molin et al.); U.S. patent application Ser. No. 13/017,089 for a Non-Zero Dispersion Shifted Optical Fiber Having a Large Effective Area, filed Jan. 31, 2011, (Sillard et al.); U.S. patent application Ser. No. 13/017,092 for a Non-Zero Dispersion Shifted Optical Fiber Having a Short Cutoff Wavelength, filed Jan. 31, 2011, (Sillard et al.); U.S. patent application Ser. No. 13/037,943 for a Broad-Bandwidth Multimode Optical Fiber Having Reduced Bending Losses, filed Mar. 1, 2011, (Bigot-Astruc et al.); and U.S. patent application Ser. No. 13/048,028 for a Single-Mode Optical Fiber, filed Mar. 15, 2011, (de Montmorillon et al.)

To supplement the present disclosure, this application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Pat. No. 7,702,204 for a Method for Manufacturing an Optical Fiber Preform (Gonnet et al.); U.S. Pat. No. 7,570,852 for an Optical Fiber Cable Suited for Blown Installation or Pushing Installation in Microducts of Small Diameter (Nothofer et al.); U.S. Pat. No. 7,646,954 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Pat. No. 7,817,891 for a Method for Accessing Optical Fibers within a Telecommunication Cable (Lavenne et al.); U.S. Pat. No. 7,639,915 for an Optical Fiber Cable Having a Deformable Coupling Element (Parris et al.); U.S. Pat. No. 7,646,952 for an Optical Fiber Cable Having Raised Coupling Supports (Parris); U.S. Pat. No. 7,724,998 for a Coupling Composition for Optical Fiber Cables (Parris et al.); U.S. Patent Application Publication No. US2009/0214167 A1 for a Buffer Tube with Hollow Channels, (Lookadoo et al.); U.S. Patent Application Publication No. US2009/0297107 A1 for an Optical Fiber Telecommunication Cable, filed May 15, 2009, (Tatat); U.S. Patent Application Publication No. US2009/0279833 A1 for a Buffer Tube with Adhesively Coupled Optical Fibers and/or Water-Swellable Element, filed Jul. 21, 2009, (Overton et al.); U.S. Patent Application Publication No. US2010/0092135 A1 for an Optical Fiber Cable Assembly, filed Sep. 10, 2009, (Barker et al.); U.S. Patent Application Publication No. US2010/0067857 A1 for a High-Fiber-Density Optical Fiber Cable, filed Sep. 10, 2009, (Lovie et al.); U.S. Patent Application Publication No. US2010/0067855 A1 for a Buffer Tubes for Mid-Span Storage, filed Sep. 11, 2009, (Barker); U.S. Patent Application Publication No. US2010/0135623 A1 for Single-Fiber Drop Cables for MDU Deployments, filed Nov. 9, 2009, (Overton); U.S. Patent Application Publication No. US2010/0092140 A1 for an Optical-Fiber Loose Tube Cables, filed Nov. 9, 2009, (Overton); U.S. Patent Application Publication No. US2010/0135624 A1 for a Reduced-Size Flat Drop Cable, filed Nov. 9, 2009, (Overton et al.); U.S. Patent Application Publication No. US2010/0092138 A1 for ADSS Cables with High-Performance Optical Fiber, filed Nov. 9, 2009, (Overton); U.S. Patent Application Publication No. US2010/0135625 A1 for Reduced-Diameter Ribbon Cables with High-Performance Optical Fiber, filed Nov. 10, 2009, (Overton); U.S. Patent Application Publication No. US2010/0092139 A1 for a Reduced-Diameter, Easy-Access Loose Tube Cable, filed Nov. 10, 2009, (Overton); U.S. Patent Application Publication No. US2010/0154479 A1 for a Method and Device for Manufacturing an Optical Preform, filed Dec. 19, 2009, (Milicevic et al.); U.S. Patent Application Publication No. US 2010/0166375 for a Perforated Water-Blocking Element, filed Dec. 29, 2009, (Parris); U.S. Patent Application Publication No. US2010/0183821 A1 for a UVLED Apparatus for Curing Glass-Fiber Coatings, filed Dec. 30, 2009, (Hartsuiker et al.); U.S. Patent Application Publication No. US2010/0202741 A1 for a Central-Tube Cable with High-Conductivity Conductors Encapsulated with High-Dielectric-Strength Insulation, filed Feb. 4, 2010, (Ryan et al.); U.S. Patent Application Publication No. US2010/0215328 A1 for a Cable Having Lubricated, Extractable Elements, filed Feb. 23, 2010, (Tatat et al.); U.S. Patent Application Publication No. US2011/0026889 A1 for a Tight-Buffered Optical Fiber Unit Having Improved Accessibility, filed Jul. 26, 2010, (Risch et al.); U.S. Patent Application Publication No. US2011/0064371 A1 for Methods and Devices for Cable Insertion into Latched Conduit, filed Sep. 14, 2010, (Leatherman et al.); U.S. patent application Ser. No. 12/907,241 for a High-Fiber-Density Optical-Fiber Cable, filed Oct. 19, 2010, (Overton et al.); U.S. patent application Ser. No. 12/907,265 for an Optical-Fiber Cable Having High Fiber Count and High Fiber Density, filed Oct. 19, 2010, (Tatat et al.); and U.S. patent application Ser. No. 13/009,118 for a Water-Soluble Water-Blocking Element, filed Jan. 19, 2011, (Parris).

This application further incorporates by reference product specifications for the following Draka multimode optical fibers: (i) Graded-Index Multimode Optical Fiber (50/125 μm), (ii) MaxCap™-OM2+ Optical Fiber, (iii) MaxCap™-OM3 Optical Fiber, (iv) MaxCap™-OM4 Optical Fiber, and (v) MaxCap™-BB-OMx Optical Fiber. This technical information is provided as Appendices 1-5, respectively, in priority U.S. Patent Application No. 61/328,837.

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. An optical-fiber cable, comprising:
a plurality of multimode optical fibers, said multimode optical fibers complying with the ITU-T G.651.1 recommendations;
a plurality of strength yarns, at least one of said strength yarns being lubricated; and
a cable jacket surrounding said multimode optical fibers and said strength yarns, said cable jacket having an outer diameter of no more than about 3.2 millimeters;
wherein the optical-fiber cable has an inner cable filling coefficient of at least about 0.15;
wherein, as measured on a drum having a diameter of about 250 millimeters, the optical-fiber cable has a maximum attenuation of less than about 3.5 dB/km at a wavelength of 850 nanometers and less than about 1.5 dB/km at a wavelength of 1300 nanometers;
wherein, as measured in accordance with the FOTP-3 procedure, the optical-fiber cable has a maximum increase in attenuation of less than about 0.60 dB/km at a wavelength of 1300 nanometers using a minimum temperature of about 0° C. and a maximum temperature of about 70° C.; and
wherein, as measured under a compressive load of about 20 lb/in and in accordance with the FOTP-41 procedure, the optical-fiber cable has a maximum increase in attenuation of less than about 0.60 dB at a wavelength of 1300 nanometers.

2. An optical-fiber cable according to claim 1, wherein:
the multimode optical fibers have macrobending losses greater than 0.1 dB at a wavelength of 850 nanometers for two turns around a bending radius of 15 millimeters; and
the multimode optical fibers have macrobending losses greater than 0.3 dB at a wavelength of 1300 nanometers for two turns around a bending radius of 15 millimeters.

3. An optical-fiber cable according to claim 1, wherein, as measured on a drum having a diameter of about 250 millimeters, the optical-fiber cable has a maximum attenuation of less than about 3.0 dB/km at a wavelength of 850 nanometers and less than about 1.0 dB/km at a wavelength of 1300 nanometers.

4. An optical-fiber cable according to claim 1, wherein, as measured on a drum having a diameter of about 250 millimeters, the optical-fiber cable has a maximum attenuation of less than about 2.8 dB/km at a wavelength of 850 nanometers.

5. An optical-fiber cable according to claim 1, wherein, as measured on a drum having a diameter of about 660 millimeters, the optical-fiber cable has a maximum attenuation of less than about 1.0 dB/km at a wavelength of 1300 nanometers.

6. An optical-fiber cable according to claim 1, wherein, as measured on a drum having a diameter of about 660 millimeters, the optical-fiber cable has a maximum attenuation of less than about 0.8 dB/km at a wavelength of 1300 nanometers.

7. An optical-fiber cable according to claim 1, wherein, as measured on a drum having a diameter of about 660 millimeters, the optical-fiber cable has a maximum attenuation of less than about 0.6 dB/km at a wavelength of 1300 nanometers.

8. An optical-fiber cable according to claim 1, wherein, as measured in accordance with the FOTP-3 procedure, the optical-fiber cable has a maximum increase in attenuation of less than about 0.40 dB/km at a wavelength of 1300 nanometers using a minimum temperature of about 0° C. and a maximum temperature of about 70° C.

9. An optical-fiber cable according to claim 1, wherein, as measured in accordance with the FOTP-3 procedure, the optical-fiber cable has a maximum increase in attenuation of less than about 0.30 dB/km at a wavelength of 1300 nanometers using a minimum temperature of about 0° C. and a maximum temperature of about 70° C.

10. An optical-fiber cable according to claim 1, wherein, as measured in accordance with the FOTP-3 procedure, the optical-fiber cable has a maximum increase in attenuation of less than about 0.60 dB/km at a wavelength of 1300 nanometers using a minimum temperature of about −20° C. and a maximum temperature of about 70° C.

11. An optical-fiber cable according to claim 1, wherein, as measured in accordance with the FOTP-3 procedure, the optical-fiber cable has a maximum increase in attenuation of less than about 0.40 dB/km at a wavelength of 1300 nanometers using a minimum temperature of about −20° C. and a maximum temperature of about 70° C.

12. An optical-fiber cable according to claim 1, wherein, as measured under a compressive load of about 20 lb/in and in accordance with the FOTP-41 procedure, the optical-fiber cable has a maximum increase in attenuation of less than about 0.40 dB at a wavelength of 1300 nanometers.

13. An optical-fiber cable according to claim 1, wherein, as measured under a compressive load of about 20 lb/in and in accordance with the FOTP-41 procedure, the optical-fiber cable has a maximum increase in attenuation of less than about 0.30 dB at a wavelength of 1300 nanometers.

14. An optical-fiber cable according to claim 1, wherein, as measured under a compressive load of about 20 lb/in and in accordance with the FOTP-41 procedure, the optical-fiber cable has a maximum increase in attenuation of less than about 0.20 dB at a wavelength of 1300 nanometers.

15. An optical-fiber cable according to claim 1, wherein, as measured under a compressive load of about 20 lb/in and in accordance with the FOTP-41 procedure, the optical-fiber cable has a maximum increase in attenuation of less than about 0.15 dB at a wavelength of 1300 nanometers.

16. An optical-fiber cable according to claim 1, wherein, as measured under a compressive load of about 20 lb/in and in accordance with the FOTP-41 procedure, at least 90 percent of said multimode optical fibers have an increase in attenuation of no more than about 0.30 dB at a wavelength of 1300 nanometers.

17. An optical-fiber cable according to claim 1, wherein the optical-fiber cable has an inner cable filling coefficient of between about 0.16 and 0.20.

18. An optical-fiber cable according to claim 1, wherein the optical-fiber cable has an inner cable filling coefficient of between about 0.18 and 0.22.

19. An optical-fiber cable according to claim 1, wherein the optical-fiber cable has an inner cable filling coefficient of at least about 0.19.

20. An optical-fiber cable, comprising:
a plurality of multimode optical fibers, said multimode optical fibers complying with the ITU-T G.651.1 recommendations;
a plurality of strength yarns, at least one of said strength yarns being lubricated; and
a cable jacket surrounding said multimode optical fibers and said strength yarns, said cable jacket having an outer diameter of no more than about 3.2 millimeters;
wherein the optical-fiber cable has an inner cable filling coefficient of at least about 0.15;
wherein, as measured on a drum having a diameter of about 250 millimeters, the optical-fiber cable has a maximum attenuation of less than about 3.5 dB/km at a wavelength of 850 nanometers and less than about 1.5 dB/km at a wavelength of 1300 nanometers;
wherein, as measured in accordance with the FOTP-3 procedure, the optical-fiber cable has a maximum increase in attenuation of less than about 0.40 dB/km at a wavelength of 1300 nanometers using a minimum temperature of about 0° C. and a maximum temperature of about 70° C.; and
wherein, as measured under a compressive load of about 20 lb/in and in accordance with the FOTP-41 procedure, the optical-fiber cable has a maximum increase in attenuation of less than about 0.30 dB at a wavelength of 1300 nanometers.

\* \* \* \* \*